(12) United States Patent
Little et al.

(10) Patent No.: US 6,396,976 B1
(45) Date of Patent: May 28, 2002

(54) 2D OPTICAL SWITCH

(75) Inventors: Michael J. Little, Oak Park; John Jeffrey Lyon, San Marcos; John E. Bowers, Santa Barbara; Roger Helkey, Montecito, all of CA (US)

(73) Assignee: Solus Micro Technologies, Inc., Westlake Village, CA (US)

( * ) Notice: Subject to any disclaimer, the term of this patent is extended or adjusted under 35 U.S.C. 154(b) by 0 days.

(21) Appl. No.: 09/550,076

(22) Filed: Apr. 14, 2000

Related U.S. Application Data

(60) Provisional application No. 60/129,337, filed on Apr. 15, 1999.

(51) Int. Cl.[7] ................................................. G02B 6/26
(52) U.S. Cl. ............................... 385/18; 385/17; 385/20
(58) Field of Search ...................................... 385/16–23

(56) References Cited

U.S. PATENT DOCUMENTS 5,345,521 A * 9/1994 McDonald et al.
5,794,761 A * 8/1998 Renaud et al.
5,920,664 A * 7/1999 Hirabayashi et al.
6,327,398 B1 * 12/2001 Solgaard et al.

* cited by examiner

*Primary Examiner*—Hung N. Ngo
(74) *Attorney, Agent, or Firm*—Fleshner & Kim, LLP

(57) ABSTRACT

An array of micromachined mirrors are arranged on a first substrate at the intersections of input and output optical paths and oriented at approximately forty-five degrees to the paths. An array of split-electrodes are arranged on a second substrate above the respective mirrors. Each split electrode includes a first electrode configured to apply an electrostatic force that rotates the mirror approximately ninety degrees into one of the input optical paths to deflect the optical signal along one of the output optical paths, and a second electrode configured to apply an electrostatic force that maintains the mirror position. Stability may be improved by using the first and second electrodes in combination to first actuate the mirror and then balance the forces on the mirror to maintain its position. Reproducibly accurate positioning of the mirrors requires either the use of active positioning control or of mechanical stops.

22 Claims, 9 Drawing Sheets

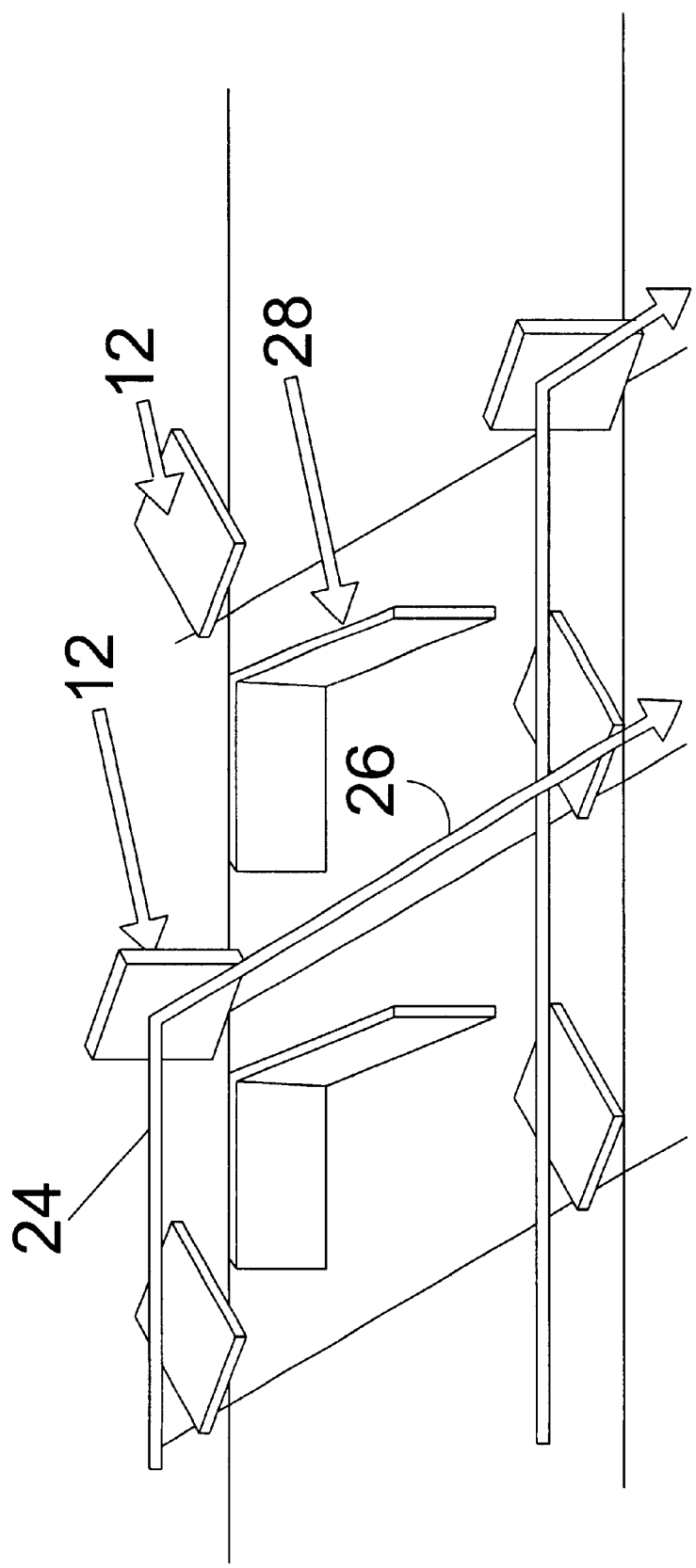

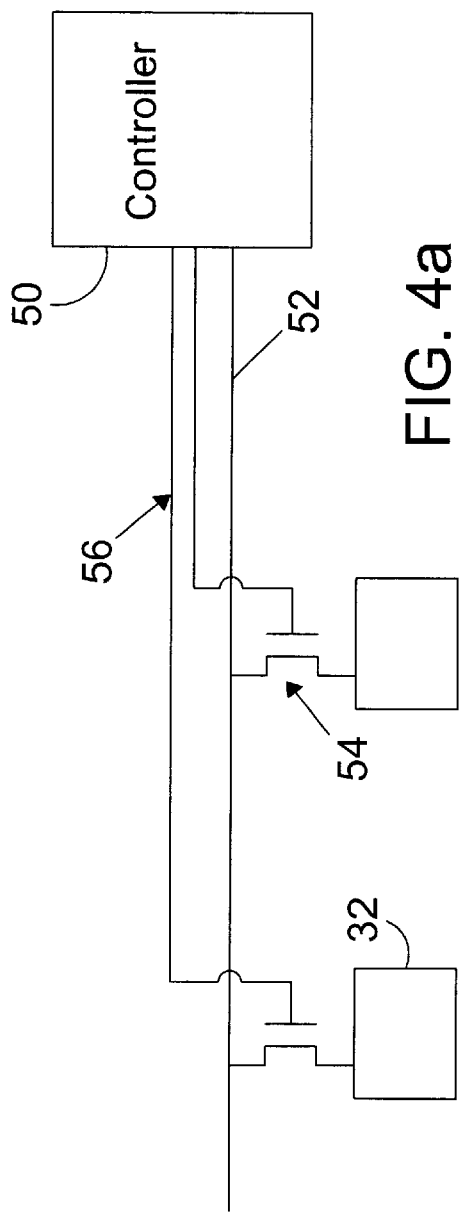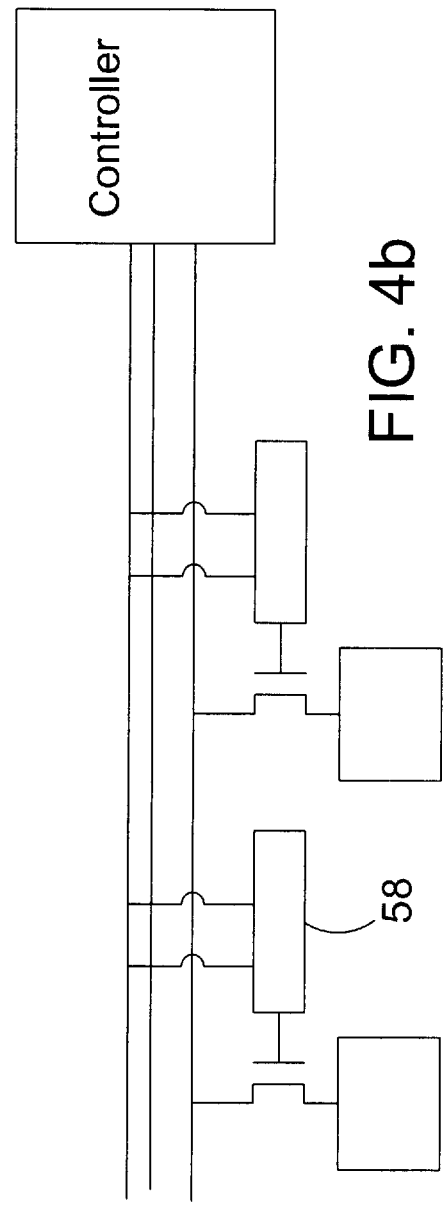

2D OPTICAL SWITCH

RELATED APPLICATIONS

Priority is claimed based on U.S. Provisional Application No. 60/129,337 entitled "Fiber Optic Crossbar Switch" filed Apr. 15, 1999.

BACKGROUND OF THE INVENTION

1. Field of the Invention

This invention relates to optical switches and more specifically to a 2D optical switch using MEMS technology.

2. Description of the Related Art

The network of copper wires that has been the backbone of the telecommunications network is rapidly being replaced with a fiber optic network to increase the bandwidth available to support the Internet and other networking applications. To date, the majority of the original long haul telephone copper network has been replaced with an optical fiber network and network links within metropolitan areas are rapidly being replaced. While this copper to fiber replacement is proceeding at a breakneck pace, the demand for high bandwidth communication is so great that the rate of replacement will accelerate.

All communication networks, either copper or optical fiber, require switches that can route signals from source to destination as well as re-route signals in case of faults or excessive demand for a specific link. Presently the switching in "long haul" and "metro" segments of fiber optic networks is done electronically. The optical signals are converted into electronic signals and then electronic switching matrices, similar to the ones used in the original copper network, are used to accomplish the routing. After routing, the electronic signals are converted back to an optical signal and sent out through the designated fiber. This type of "optical" routing switch is large, expensive and inefficient. The electronic components of this type of switch are the major bottleneck in overall network throughput capacity.

The rapid growth in the number of fiber optic lines has created an urgent need for an all optical router; one that does not need to transform the signal into an electronic signal. An optical crossbar switch, routes N incoming fiber optic channels to N outgoing fiber optic channels by selective actuation of a micro-mirror array to alter the desired light paths. These MEMS based optical crossbar switches should be capable of routing more channels on a single device, and be far cheaper and more compact than opto-electronic switches.

To date MEMS crossbar switches have not fulfilled their promise. The current switch designs and the limited manufacturing yields have constrained the size of useful devices, typically 2×2. Although these small devices can be cascaded together to form a larger device such a configuration is complicated, lossy and very expensive. Some of the key problems have, and continue to be, the inability to precisely control the deflection angles of the micro-mirrors, to reduce the footprint of the actuation mechanism, and to monolithically fabricate the MEMS structures on an integrated circuit (IC).

Two main categories of MEMS optical crossbar switches exist. The first is based on sliding a vertical mirror in and out of a light path to perform a switching function. Lucent Technologies, Inc., U.S. Pat. No. 5,923,798 proposed an "in-plane" optical switch that includes an actuator comprising two vertically-oriented electrodes, and a linkage from the actuator to an optical device. As a voltage is applied across the electrodes, the movable electrode swings toward the fixed electrode. The horizontal displacement of the electrode is transferred to the optical devices which moves in-plane in or out of the optical path.

Lucent Technologies, Inc., U.S. Pat. No. 5,995,688, also proposed a micro-opto-electromechanical devices performing "on-off" switching function for only one optical channel. The MEMS device comprises an actuator that is mechanically linked to an optical interrupt (e.g., micro-mirror). The first end of the linkage underlies and abuts a portion of movable plate electrode, and a second end of linkage supports optical interruptor. The interruptor is a vertically assembled mirror that is attached to the linkage. When a voltage is applied across plate actuator, an electrostatic attraction causes a vertical or out-of-plane motion to linkage such that optical interrupter moves "up-and-down". In an actuated state, the device causes the optical interrupt of an optical signal. This device can be practically used only as one channel chopper.

The second category of switches is based on hinged mirrors that can be rotated out of the plane of the substrate to a vertical position to perform the switching function by selectively blocking the light path. Various mechanisms exist to provide the actuation force necessary to rotate the hinged mirrors including magnetic, thermal and electrostatic. Electrostatic actuation includes both lateral comb drive (in-plane) actuation and parallel-plate (out-of-plane) actuation. Lateral comb drives are used in combination with scratch drives, stepper motors, linear micro-vibrometers and micro-engines.

H. Toshiyoshi et al. "Electrostatic micro torsional mirrors for an optical switch matrix," IEEE J. Microelectromechanical System, Vol. 5, no. 4, pp. 231–237, 1996 describes a free-space optical switch based on parallel-plate actuation. The device is composed of two parts: torsion mirror substrate (a) and counter electrode substrate (b). As shown in FIG. 5, a bulk micromachining process is used to fabricate the mirror substrate in which a matrix of micro mirrors are supported by torsion beams across respective through-holes etched into the backside of the substrate. Bulk micromachining is relatively slow, expensive, provides only nominal control of mirror thickness and flatness, and is not compatible with IC fabrication processes. The mirror and counter electrode substrates are manually aligned by microscope observation and fixed by putting epoxy glue on the edge.

Application of a bias voltage to the mirror and counter electrodes attracts the mirror inward by 90° to reflect the incident light. The incident and redirected lights can propagate through the deep grooves formed on the backside of the substrate; i.e., the mirrors are located at the crossings by 45° inclination to the grooves. The angle of the mirror in the ON-state (90°) is controlled because it touches a mechanical stopper on the counter substrate.

The stiction force between the mirror and stopper creates a hysteresis whereby the applied voltage can be reduced and yet be able to hold the mirror in the ON-state. The spring force of the hinged mirror must be sufficient to overcome the stiction force when the holding voltage is completely removed in order to return the mirror to the OFF-state. Consequently, the applied voltage must be sufficient to overcome the mirror's spring force to drive the mirror to the ON-state, approximately 100–150V, which is not compatible with either standard IC processing or off-the-shelf driver chips.

Although the switch configuration may, in theory, be extended to arbitrary sizes it will in practice be limited to small devices on the order of 2×2. The combination of a mechanical stop, bulk processing and manual assembly of the mirror and counter electrode substrates limits the precision of the mirror deflection angle in the ON-state. The small (input) acceptance angle of the output fiber forces a high degree of precision on the deflection angle. This in turn determines the maximum path length between an input fiber and an output fiber, hence the array size. In addition, array size is limited by space considerations owing to the fact that a lead must be provided for each mirror in each row or column and the actuator footprint.

SUMMARY OF THE INVENTION

In view of the above problems, the present invention provides a free-space micromachined 2D optical switch with improved precision, hence larger array sizes, at lower cost, whose fabrication is compatible with standard IC processes. The 2D optical switch will find particular use in an all-optical fiber network and, even more specifically, in the last mile of the network.

A packaged 2D switch includes a plurality of input and output fibers mounted between first and second substrates for affecting respective optical signals travelling along respective input optical paths and for receiving respective optical signals travelling along output optical paths substantially orthogonal to the input optical paths. An array of micromachined mirrors are arranged on the first substrate at the intersections of the input and output optical paths and oriented at approximately forty-five degrees to the paths. Without activation the mirrors are held horizontally and do not interrupt the light paths.

An array of split-electrodes are arranged on the second substrate above the respective mirrors. Each split electrode includes a first electrode configured to apply an electrostatic force that rotates the mirror approximately ninety degrees into one of the input optical paths to deflect the optical signal along one of the output optical paths, and a second electrode configured to apply an electrostatic force that maintains the mirror in its position. Stability may be improved by using the first and second electrodes in combination to first actuate the mirror and then balance the forces on the mirror to maintain its position. Reproducibly accurate positioning of the mirrors requires either the use of active positioning control or of mechanical stops.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 1a and 1b are respectively plan and partial perspective views of a 2D mirror switch in accordance with the present invention;

FIGS. 4a through 4c illustrate modified frame and multiplexed addressing configurations for the 2D optical switch;

DETAILED DESCRIPTION OF THE INVENTION

The present invention provides a free-space micromachined 2D optical switch with improved precision, hence larger array sizes, at lower cost whose fabrication is compatible with standard IC processes. A split-electrode configuration enhances the precision control of the free-space micromachined mirrors required by smaller, less expensive switches and larger, more expensive switches, respectively. The 2D optical switch will find particular use in an all-optical fiber network and, even more specifically, in the last mile of the network.

Figure 1A:
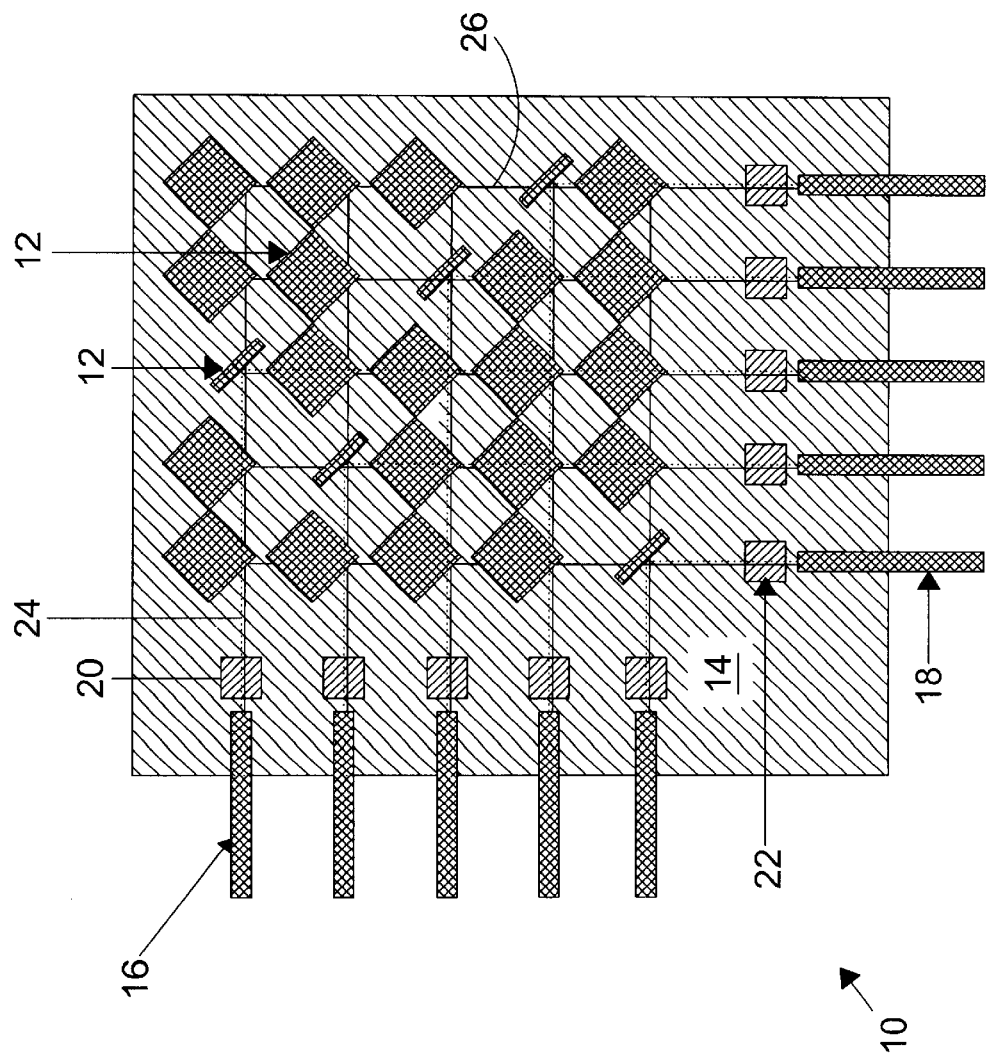

A MEMS design for an N×M switch 10 is a matrix of micromachined mirrors 12 arranged in a crossbar configuration on a substrate 14 as shown in FIG. 1a. The mirrors are positioned at 45° relative to the input and output fibers 16 and 18, respectively, and their collimating lenses 20 and 22. In their undeflected state, mirrors 12 lie in the plane of substrate 14 below the input and output optical paths 24 and 26, respectively, traveled by light from the fibers. Once flipped vertically, a mirror intercepts the input optical path 24 and reflects the collimated light along one of the output optical paths 26 to an output fiber 18. Accuracy of the mirror angle in the vertical position is a major challenge to the efficacy of this design. Assuming that the fiber/lens arrays are perfectly orthogonal, all mirrors must have the same vertical angle to achieve a low insertion loss. A split-electrode array is used in accordance with the invention to achieve the reproducibly accurate positioning required. Another major challenge is crosstalk between optical paths, which is addressed with the insertion of baffles 28 as best shown in FIG. 1b.

Figure 2:
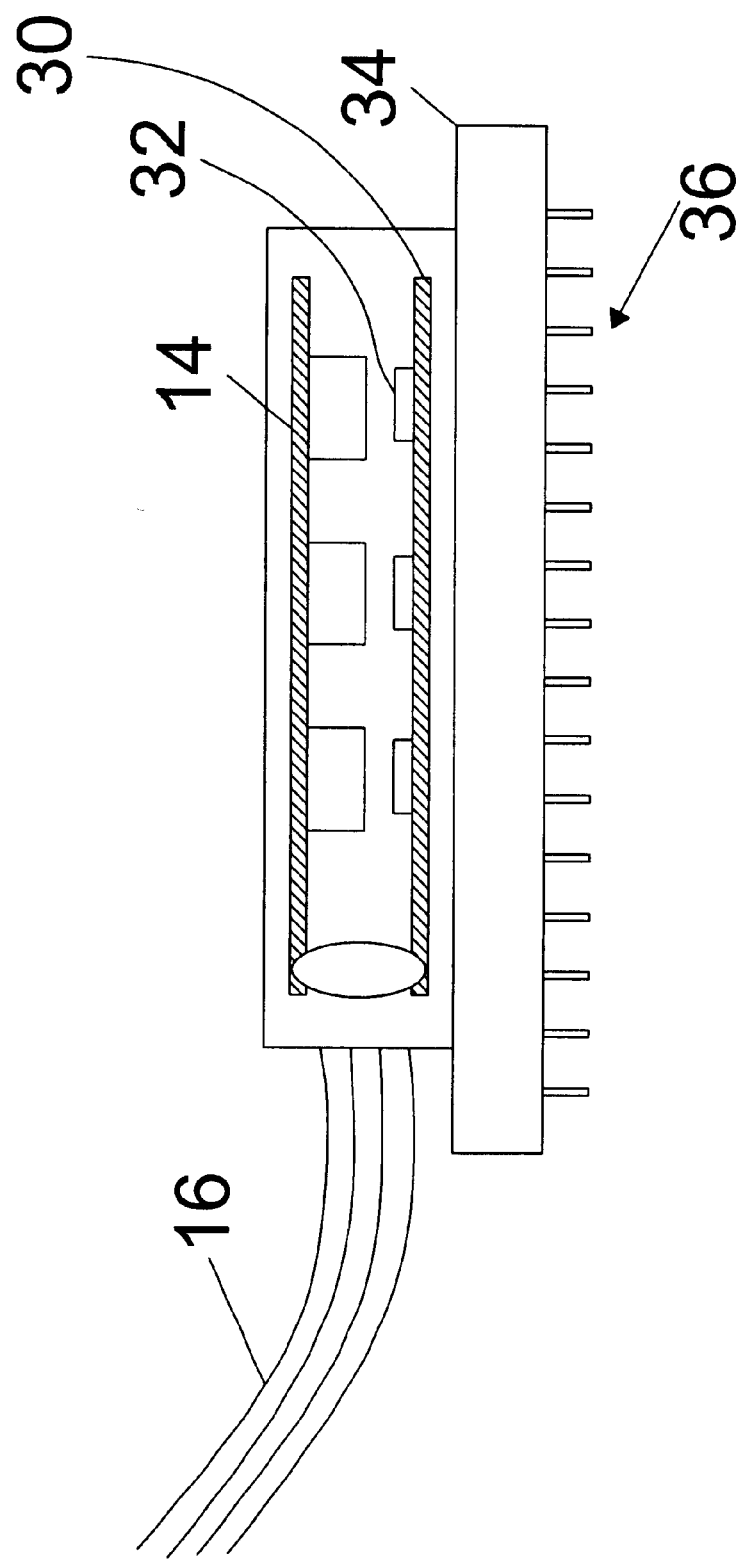
FIG. 2 is a perspective view of a packaged 2D mirror.

As shown in FIG. 2, a packaged 2D switch includes input fibers 16 and output fibers (not shown) mounted between first and second substrates 14 and 30, respectively, for affecting respective optical signals travelling along respective input optical paths and for receiving respective optical signals travelling along output optical paths substantially orthogonal to the input optical paths. An array of micromachined mirrors 12 are arranged on first substrate 14 at the intersections of the input and output optical paths and oriented at approximately forty-five degrees to the paths.

An array of split-electrodes 32 are arranged on the second substrate 30, which may be mounted on an addressing chip 34 having I/O pins 36. Each split electrode includes a pair of electrodes configured to apply an electrostatic force that first rotates the mirror approximately ninety degrees into one of the input optical paths to deflect the optical signal along one of the output optical paths and then precisely maintains the desired mirror position. Reproducibly accurate positioning of the mirrors requires either the use of active positioning control or of mechanical stops.

Figure 3A:
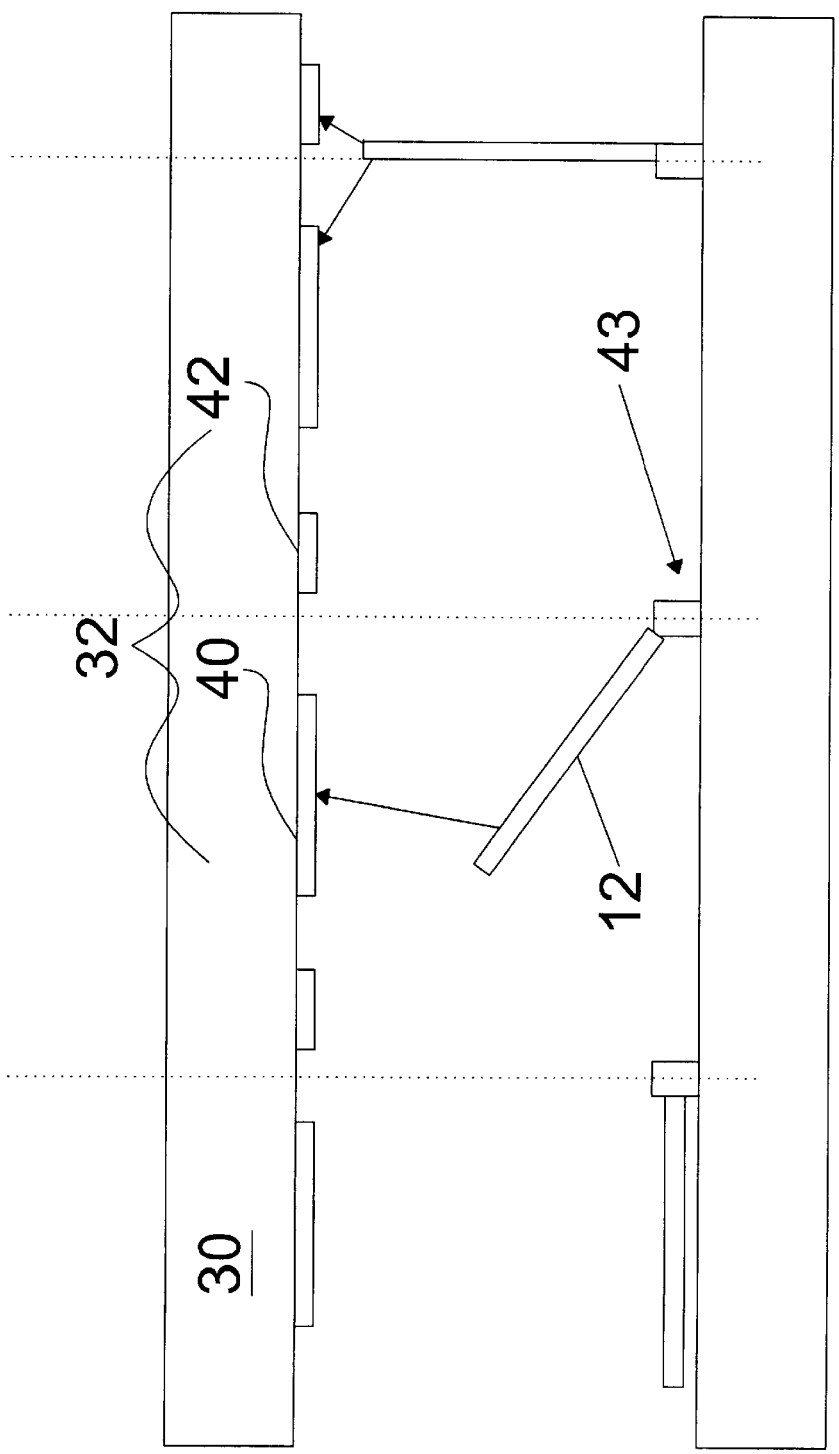
FIGS. 3a and 3b are a sectional view and diagrammatic illustration of a split-electrode for controlling a micromachined mirror.
Figure 3B:
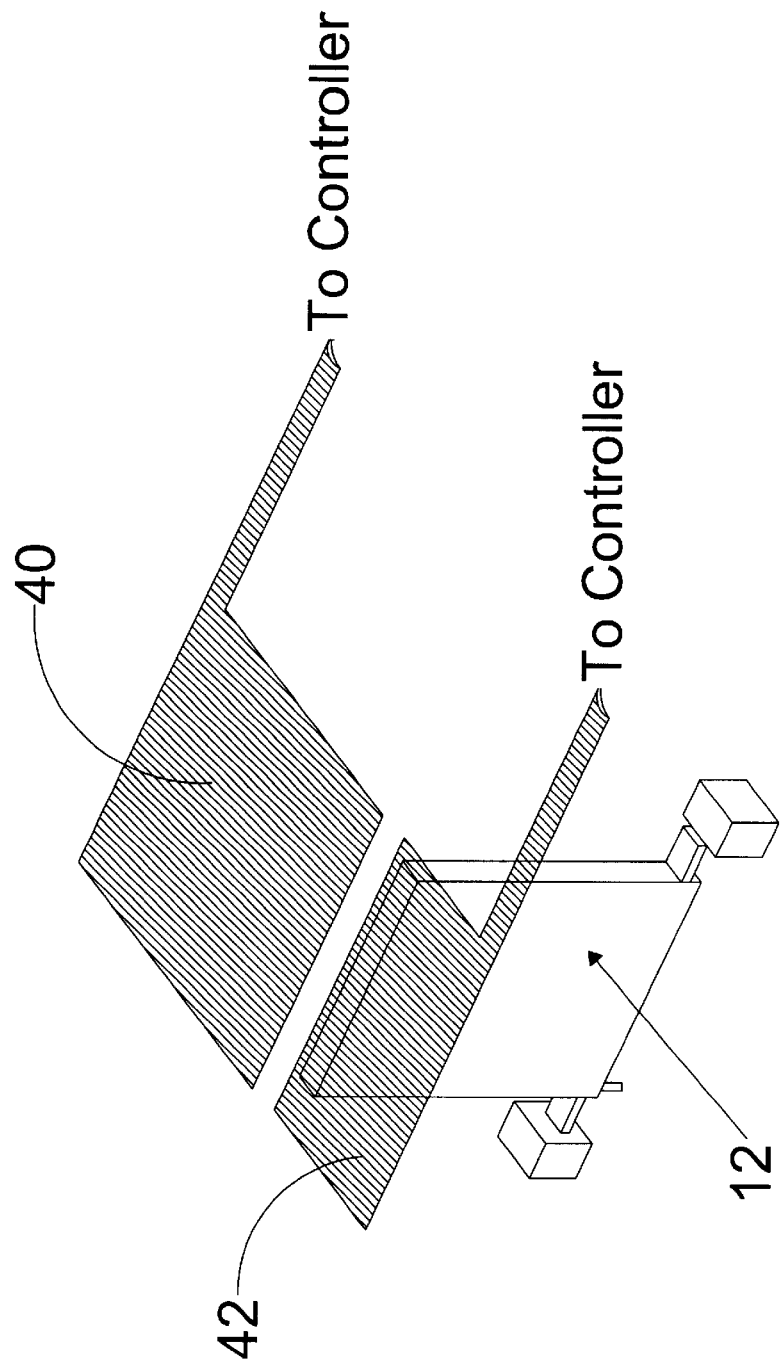

As best illustrated in FIGS. 3a and 3b, each split electrode 32 includes a first electrode 40 and a second electrode 42 on substrate 30 above mirror 12, which is supported by a hinge 43 for rotation out of the plane of substrate 14. The selective application of voltages to the pair of electrodes with the mirror held at a reference potential serves both to actuate the mirror approximately 90° and to trim the mirror position to maximize the optical power at the output fiber. First and second electrodes 40 and 42, respectively, are suitably positioned at less than and greater than 90° with respect to the rotation of the mirror.

Accordingly, first electrode 40 is most effective during the initial raising of the mirror because it lies directly over the mirror. The first electrode's effectiveness diminishes to almost nothing as the mirror approaches 90°. Should the mirror rotate past 90° the first electrode is now effective to pull the mirror back to stabilize its position. Second electrode 42 begins to be effective about halfway, approximately 50°, and because it is placed beyond directly overhead continues to be effective past 90°.

The split-electrode configuration provides great flexibility for addressing the mirrors to both actuate the mirror to an approximately vertical position and then finely trim its position to optimize performance. In particular, the first electrode can be used to actuate the mirror and the second electrode used to maintain its position; the force produced by the second electrode balancing the spring force exerted by the mirror. Alternately, the pair of electrodes can be used to balance the forces on the mirror to maintain its position by either varying the voltages on both electrodes or varying the voltage on one electrode and leaving the other fixed. This approach should provide enhanced stability. In yet another configuration, the voltages on the first and second electrodes could be fixed (at different values) and the voltages on the mirrors (held at a reference level in previous embodiments) controlled to both actuate and maintain mirror position.

Standard frame and multiplexed techniques in combination with a controller can be used to address the 2D optical switch 10. One of the major limitations is chip space. To minimize chip space and thus cost, it is preferable that any support circuitry, e.g. the controller or memory, fit within the footprint of each device, and the number of data or control lines be minimized. In typical frame addressed ICs, each device has a dedicated controller and data line so that an entire frame of data can be loaded simultaneously. Controllers are typically much larger then the footprint of a typical mirror, thus the need for $N^2$ controllers where N is the array dimension typically means that the devices must be moved far apart. In a multiplexing scheme, as each successive row of mirrors is enabled, the N controllers load the data into the respective storage elements. This reduces the number of controllers and data lines to N but requires the addition of a storage element, e.g. a capacitor, at each device and a control line for each row, and the duty cycle falls to 1/N. Chip space limitations are made worse by the fact that the split-electrode configuration requires voltages to be supplied at twice as many electrodes without increasing the footprint.

Figure 4C:
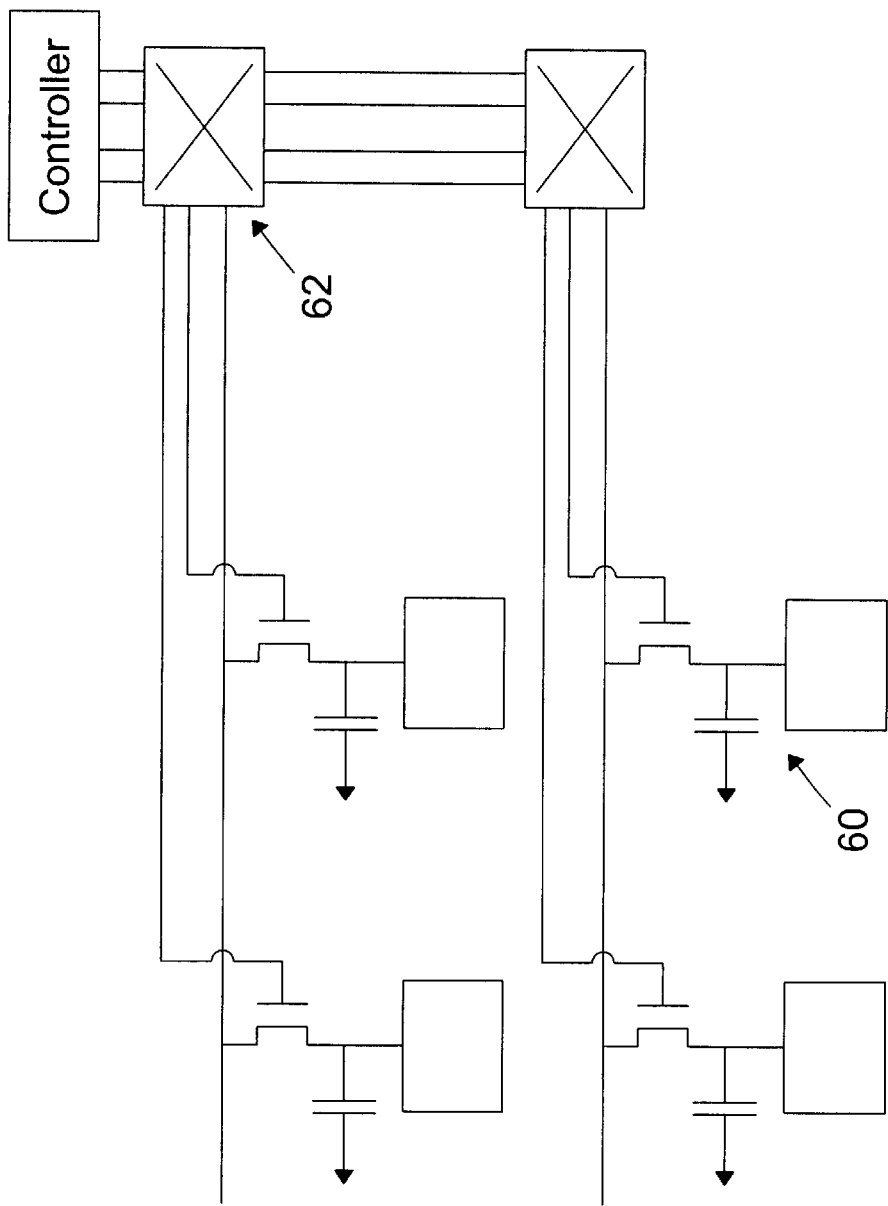

Because only one mirror in any row or column can be actuated at any given time, these standard frame and multiplexed addressing techniques can be modified for the 2D optical switch as shown in FIGS. 4a, 4b and 4c. In general these modifications greatly reduce the number of controllers but increase the number of control lines. A comparison of the standard frame and multiplexing techniques and those shown in FIGS. 4a–4c is given in Table 1. Which configuration is preferred will depend on the application.

For purposes of clarity, the addressing techniques will be shown and described as if the split-electrode comprised a single electrode. It is to be understood that merely duplicating the technique for the second electrode would double the number of controllers and data lines. However, it may be possible, and preferable, to fix the voltage on the second electrode and only cycle its voltage when the mirror array is reconfigured, e.g. set the electrode voltage equal to the mirror voltage thereby removing the attractive force and letting the mirror return to its natural position. This would require only a minimal number of data lines to carry the fixed voltage to all of the second electrodes. Alternately, both electrodes could be held at fixed voltages and the mirrors could be addressed.

As shown in FIG. 4a, a single controller 50 sets the voltage on a single data line 52, which is connected to each split-electrode 32 in the row through N switches 54, which are connected to controller 50 via N control lines 56. The controller turns on one of the switches so that the voltage is applied to the electrode and held by the controller as long as the switch is on. This approach requires only N controllers and provides a 100% duty cycle but requires $N^2$ control lines.

As N becomes large, the space constraints associated with the $N^2$ control lines in FIG. 4a becomes a problem. As shown in FIG. 4b, a simple binary logic circuit 58 can be included with each switch 54, which allows an M-bit control signal to be carried on $M=\log_2 N$ control lines in each row. This reduces the total number of control lines from $N^2$ to $N\log_2 N$ but adds $N^2$ logic circuits.

As shown in FIG. 4c, multiplexing can be achieved using only a single controller for the entire array. As with standard multiplexing, a storage element 60 must be placed at each electrode and the duty cycle drops to 1/N. In order to multiplex the array, the scan time (time between successive addressing of a particular row via switches 62) has to be very short relative to the effective response time of the mirror. This can be achieved by adding a capacitor at each split-electrode, suitably a dielectric layer such as silicon oxide or silicon nitride, to slow the mirror's electrical response time. This capacitor serves the dual function of slowing the mirror response and storing the applied voltage.

Figure 5:
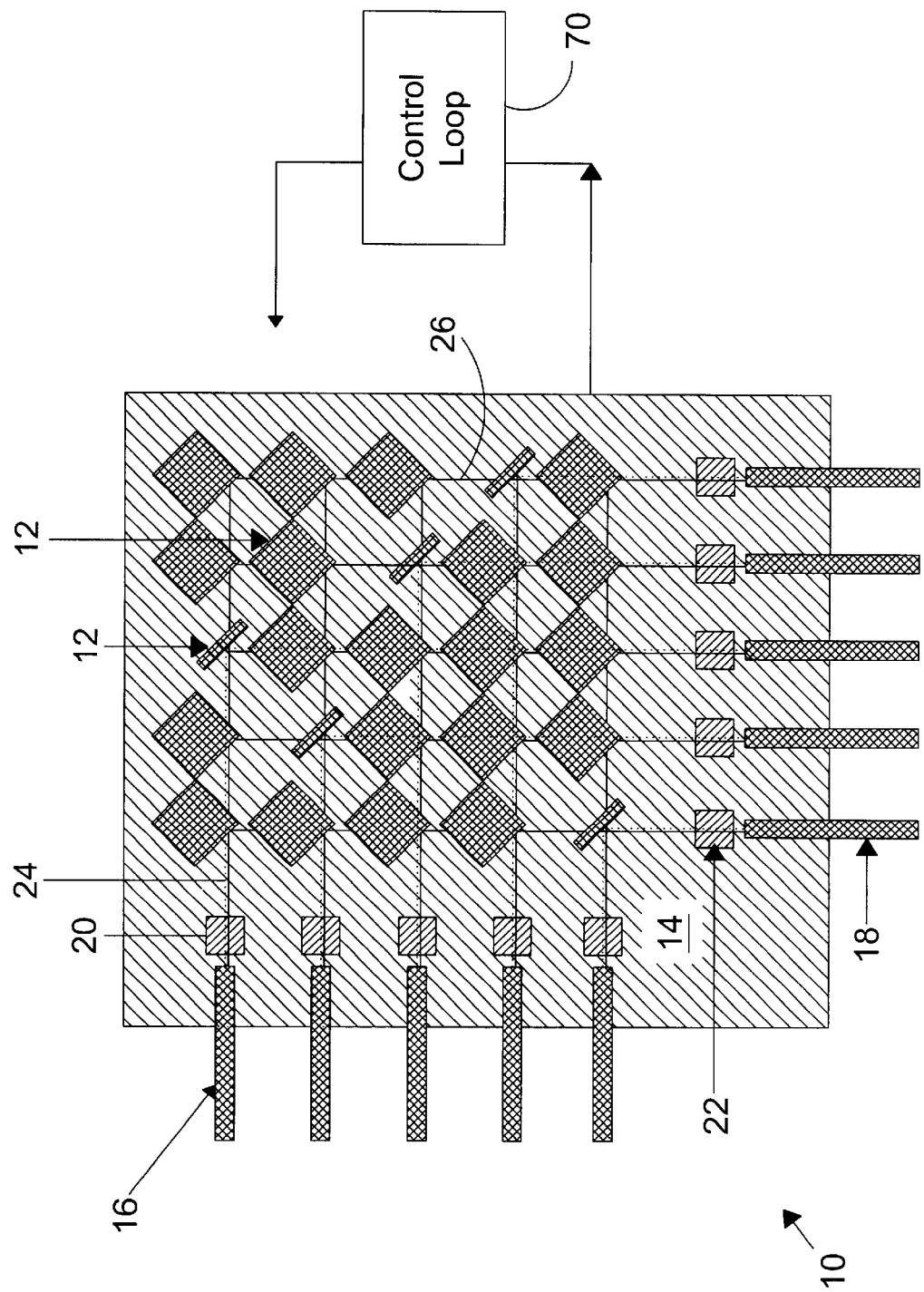
FIG. 5 is a schematic illustration of a feedback control loop.

Reproducibly accurate positioning of the mirrors requires either the use of active positioning control or of mechanical stops. In optical switches that require large mirror arrays or very low insertion losses, active control is required to achieve the extremely tight tolerances on mirror deflections. As illustrated in FIG. 5 the principles of active control and techniques used to implement a feedback control loop are well known to those skilled in the art. See for example, Behin et al. "Magnetically Actuated Micromirrors for Fiber-Optic Switching" Solid-State Sensor and Actuator Workshop, Hilton Head Island, S.C., June 8–11, pp. 273–276 and Gustafson et al. "Micro-Actuated Mirrors for Beam Steering" SPIE Vol. 3008, pp. 91–99, 1998, which are hereby incorporated by reference. In the optical switch, feedback control loop 70 senses the mirror position and adjusts the electrostatic force exerted by the control electrodes on the mirror to maintain the mirror within a tolerance of a desired position.

There are cases where the accuracy of the mirror position may not require active positioning control. Normally mirror pointing errors cause the output fiber to intercept only a portion of the optical footprint. Since smaller arrays generally have shorter path lengths, the effect of an angular misalignment is reduced. Also if a higher insertion loss can be tolerated then the mirror angle accuracy requirements can be reduced.

Figure 6:
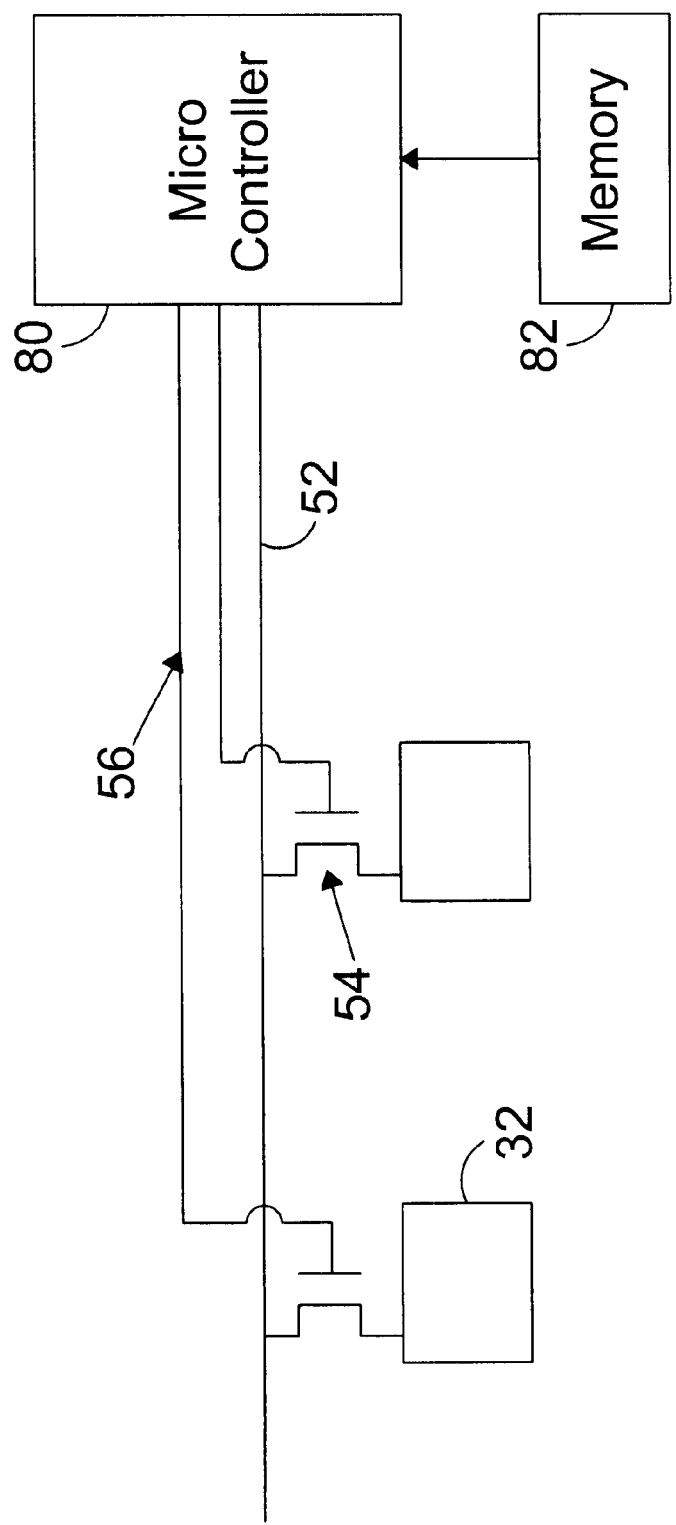
FIG. 6 is a schematic illustration of an open-loop system

Under these conditions it may be possible to build 2D optical switch arrays where the mirror positions are repeatable over time and static misalignments can be calibrated out by storing appropriate voltage values for each mirror so that the mirror positions are optimized. As shown in FIG. 6, a microcontroller 80 reads the voltage values out of a memory 82 and applies them to the electrodes using the same frame or multiplexed addressing techniques described above.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A 2D optical switch, comprising:
   a micromachined mirror movable in a rotating manner; and
   a split-electrode including,
      a first electrode configured to apply an electrostatic force that rotates the mirror; and
      a second electrode configured to apply an electrostatic force that maintains the mirror in its rotated position.

2. The 2D optical switch of claim 1, wherein said first and second electrodes are positioned at less than and greater than a ninety degree rotation of the mirror, respectively.

3. The 2D optical switch of claim 2, wherein said first electrode applies an electrostatic force that balances the force applied by the second electrode to maintain mirror position.

4. The 2D optical switch of claim 3, wherein said first electrode is primarily effective to raise the mirror and secondarily effective to maintain the mirror position and said second electrode is primarily effective to maintain the mirror position and secondarily effective to raise the mirror.

5. The 2D optical switch of claim 4, wherein said first and second electrodes apply forces that act together to raise the mirror but because they are positioned on the opposite side of the ninety degree rotation of the mirror apply forces that oppose each other to maintain mirror position.

6. The 2D optical switch of claim 1, wherein the mirror is actuated to deflect an optical signal from an input optical device to an output optical device, further comprising a feedback control loop that senses the mirror position and adjusts the electrostatic forces exerted by the electrodes on the mirror to maintain the mirror within a tolerance of a desired position.

7. A 2D optical switch, comprising:
   a micromachined mirror movable in a rotating manner;
   a split-electrode including,
      a first electrode configured to apply an electrostatic force that rotates the mirror to approximately a desired position; and
      a second electrode configured to apply an electrostatic force that maintains the mirror in its rotated position, and
   a control feedback loop that senses the mirror position and adjusts the electrostatic force exerted by the second electrode on the mirror to maintain the mirror within a tolerance of the desired position.

8. The 2D optical switch of claim 7, wherein said first and second electrodes are positioned at less than and greater than a ninety degree rotation of the mirror, respectively.

9. The 2D optical switch of claim 8, wherein said first electrode applies an electrostatic force that balances the force applied by the second electrode to maintain mirror position.

10. The 2D optical switch of claim 9, wherein said first electrode is primarily effective to raise the mirror and secondarily effective to maintain the mirror position and said second electrode is primarily effective to maintain the mirror position and secondarily effective to raise the mirror.

11. The 2D optical switch of claim 10, wherein said first and second electrodes apply forces that act together to raise the mirror but because they are positioned on the opposite side of the ninety degree rotation of the mirror apply forces that oppose each other to maintain mirror position.

12. A 2D optical switch, comprising:
    first and second substrates,
    a first optical device mounted between said first and second substrates for affecting an optical signal traveling along an optical path,
    a second optical device mounted between said first and second substrates,
    a micromachined mirror on said first substrate movable in a rotating manner;
    a split-electrode on said second substrate above said micromachined mirror including,
       a first electrode positioned at less than a ninety degree rotation, and
       a second electrode positioned at greater than a ninety degree rotation, said first and second electrodes configured to receive voltages and apply an electrostatic force that first rotates and then maintains the mirror by approximately ninety degrees into the optical path to deflect the optical signal to the second optical device, and
    a controller that applies the voltages to said first and second electrodes to position the mirror to accurately deflect the optical signal to the second optical device.

13. The 2D optical switch of claim 12, wherein the controller comprises a control feedback loop that senses the mirror position and adjusts the electrostatic force exerted by the electrodes on the mirror to maintain the mirror within a tolerance of a desired position.

14. The 2D optical switch of claim 12, wherein said first and second electrodes are positioned at less than and greater than a ninety degree rotation of the mirror, respectively.

15. The 2D optical switch of claim 14, wherein said first electrode applies an electrostatic force that balances the force applied by the second electrode to maintain mirror position.

16. The 2D optical switch of claim 15, wherein said first electrode is primarily effective to raise the mirror and secondarily effective to maintain the mirror position and said second electrode is primarily effective to maintain the mirror position and secondarily effective to raise the mirror.

17. The 2D optical switch of claim 16, wherein said first and second electrodes apply forces that act together to raise the mirror but because they are positioned on the opposite side of the ninety degree rotation of the mirror apply forces that oppose each other to maintain mirror position.

18. A 2D optical switch, comprising:
    a first substrate,
    a second substrate,
    a plurality of input fibers mounted between said first and second substrates for affecting respective optical signals travelling along respective input optical paths,
    a plurality of output fibers mounted between said first and second substrates for receiving respective optical signals travelling along respective output optical paths substantially perpendicular to said input optical paths,
    an array of micromachined mirrors on said first substrate at the intersections of said input and output optical paths and oriented at approximately forty-five degrees to said input and output paths, each said mirror being movable in a rotating manner;
    an array of split-electrodes on said second substrate above the respective mirrors, each said split electrode including,
    a first electrode, and
    a second electrode, said first and second electrodes configured to apply an electrostatic force that first rotates the mirror by approximately ninety degrees into the optical path to deflect the optical signal to the second optical device and then maintains the mirror position, and a control feedback loop that senses the mirror position and adjusts the electrostatic force exerted by the second electrode on the mirror to maintain the mirror within a tolerance of a desired position.

19. The 2D optical switch of claim 18, wherein said first and second electrodes are positioned at less than and greater than a ninety degree rotation of the mirror, respectively.

20. The 2D optical switch of claim 19, wherein said first electrode applies an electrostatic force that balances the force applied by the second electrode to maintain mirror position.

21. The 2D optical switch of claim 20, wherein said first electrode is primarily effective to raise the mirror and secondarily effective to maintain the mirror position and said second electrode is primarily effective to maintain the mirror position and secondarily effective to raise the mirror.

22. The 2D optical switch of claim 21, wherein said first and second electrodes apply forces that act together to raise the mirror but because they are positioned on the opposite side of the ninety degree rotation of the mirror apply forces that oppose each other to maintain mirror position.

* * * * *